Sept. 7, 1937.  L. A. HARPER  2,092,156
BRACKET
Filed May 4, 1936  2 Sheets-Sheet 1
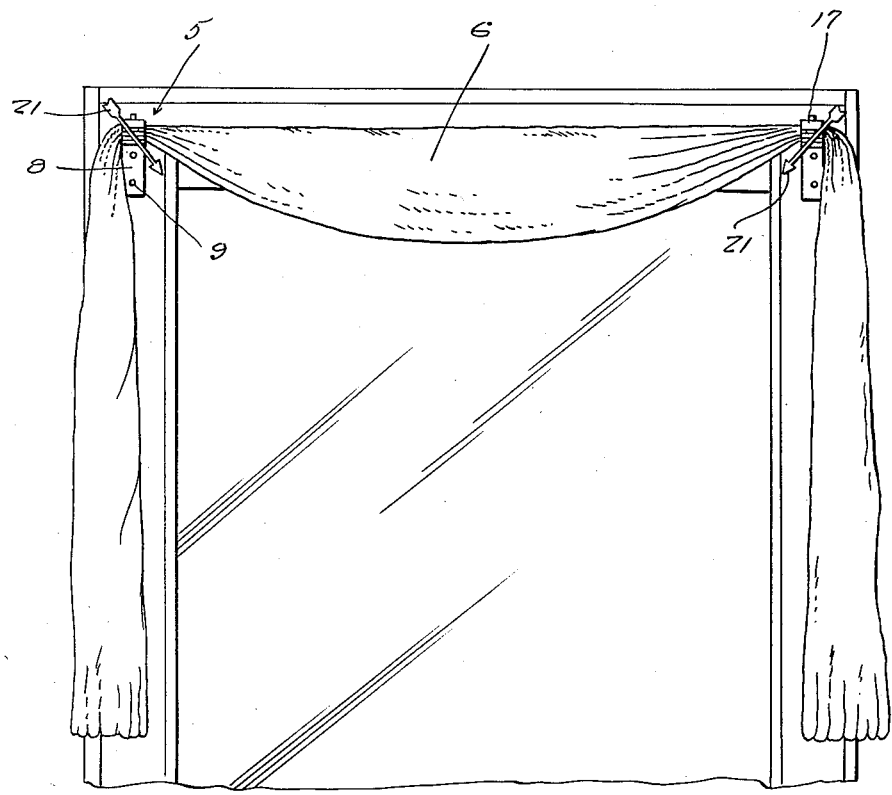
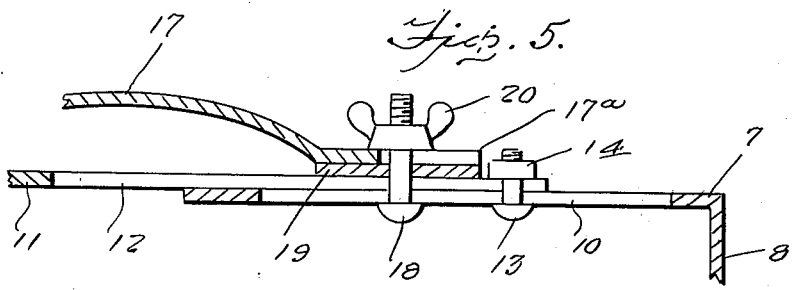
Inventor
L. A. Harper
By Clarence A. O'Brien
Hyman Berman
Attorneys Sept. 7, 1937.　　　　　L. A. HARPER　　　　　2,092,156
BRACKET
Filed May 4, 1936　　　　　2 Sheets-Sheet 2
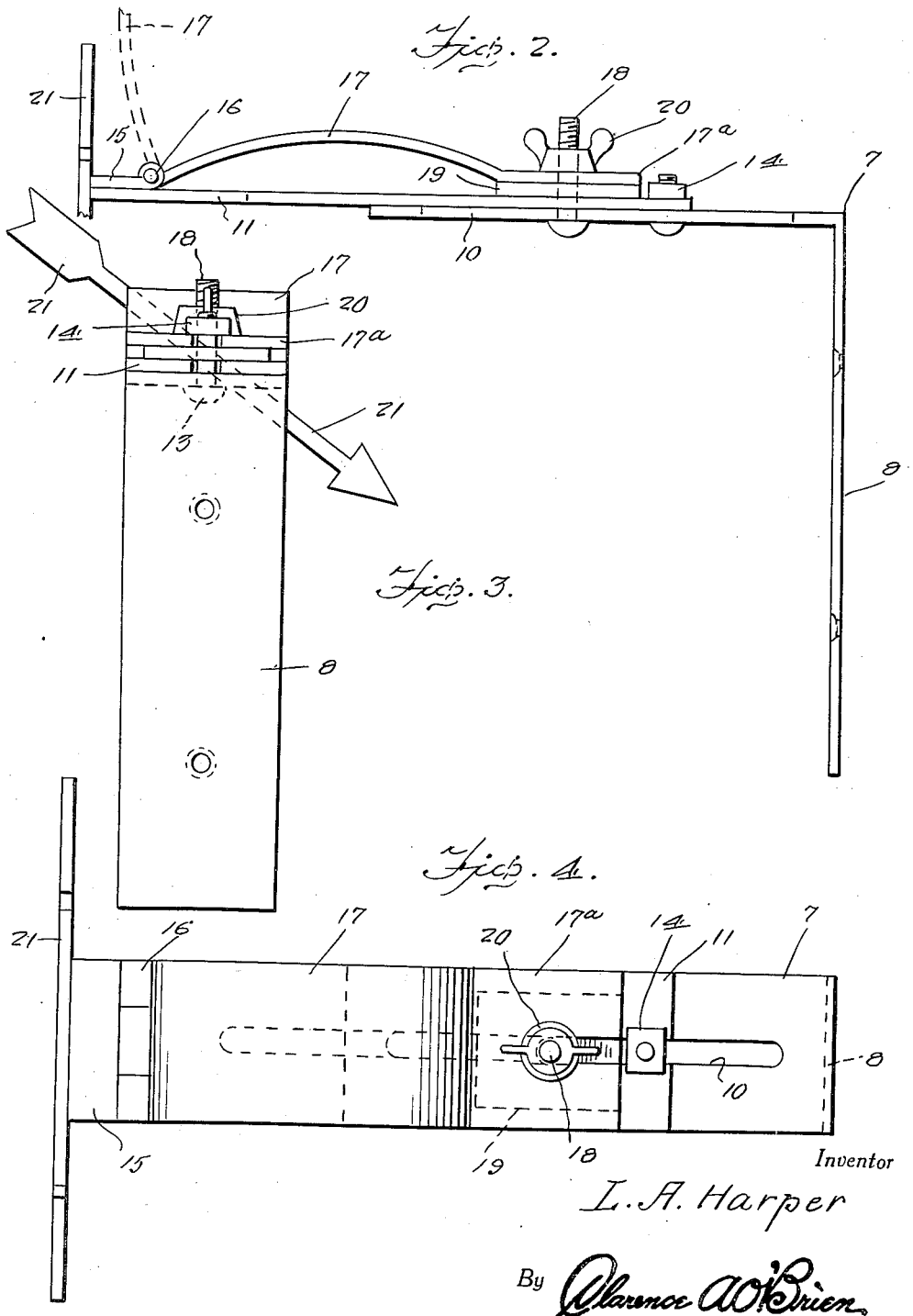

Patented Sept. 7, 1937

2,092,156

UNITED STATES PATENT OFFICE 2,092,156

BRACKET

Luther A. Harper, Galveston, Tex.

Application May 4, 1936, Serial No. 77,833

2 Claims. (Cl. 156—33)

This invention relates broadly to brackets and more particularly to brackets of the type particularly designed for supporting window drapes.

An object of the present invention is to provide a bracket which will support a window drape in a positive and efficient manner; and also to provide a bracket which may be cheaply and economically constructed, is adjustable, can be readily and quickly applied to a window frame or the like and which will have a positive engagement with the drape to retain the same in proper position.

The invention together with its objects and advantages will be best understood from a study of the following description taken in connection with the accompanying drawing wherein:—

Figure 1 is an elevational view illustrating an application of the invention.

Figure 2 is a side elevational view of the brackets.

Figure 3 is a rear elevational view of the bracket.

Figure 4 is a top plan view thereof, and

Figure 5 is a fragmentary detail sectional view illustrating certain structural features hereinafter more fully referred to.

Referring to the drawings by reference numerals it will be seen that in the contemplated use of the invention two brackets indicated by the reference numeral 5 will be employed, the brackets being mounted at the upper end, and at opposite corners of a window frame, door frame, room entrance openings or the like and as suggested in Figure 1 so as to support therebetween in a manner thought to be clear drapes or the like 6.

In accordance with the present invention each of the brackets include a substantially L-shaped member 7 having an apertured vertical attaching arm 8 through the medium of which and fastening elements 9 the section or member 7 of the bracket is secured in proper position on the window frame or the like.

The member 7 has a horizontal arm provided with a slot 10 and arranged in overlapping sliding relation with the arm 10 is an arm extension 11 provided with an elongated slot 12 which together with the slot 10, bolt 13, and nut 14, cooperate to secure the arm 11 at the desired adjustment relative to the horizontal arm of the member 7.

Suitably secured to the top of the arm extension or plate 11 at the free end of the latter is a hinge plate 15 to which is hinged as at 16 a longitudinally curved clamping jaw 17 that has a flat notched free end 18.

For securing the clamping jaw 17 down into clamping association with the arm extension 11 in a manner to secure therebetween a portion of the drape 6 there is provided a bolt 18 that extends upwardly through the slots 10 and 12, and also through a spacer plate or washer 19 that is interposed between the slotted ends of the plate extension 11 and the end 18 of the jaw 17, and associated with the bolt 18 is a wing nut 20 which when threaded home against the slotted end piece 17a of jaw 17 will serve to secure the jaw 17 down into proper clamping relation with the plate or arm extension 11.

Also if desired and as shown, the arm or plate extension 11 may be provided at its outer free edge with a suitable ornament, as for example a diagonally disposed arrow 21 or the like.

In actual practice and as thought to be apparent the brackets 5 are first mounted in position on the frame at opposite corners of the latter and the drapes 6 then draped over the horizontal longitudinally extensible arms of the brackets in a manner suggested in Figure 1. The jaws 17 are then closed down over the portions of the drapes 6 that are disposed over the aforementioned longitudinally extensible arm portions of the brackets and the jaw members 17 then fastened down by threading home the bolts 20.

It will thus be seen that the drape will not be likely to slide off of the bracket but on the other hand will be maintained in engagement with the bracket at all time, consequently presenting a neat and attractive appearance.

It is thought that the utility and advantages of an invention of this character will be had without a more detailed description.

Having thus described the invention what is claimed as new is:—

1. A bracket of the character described comprising a substantially L-shaped member one arm of which is adapted to be secured to a support with the other arm of said member extending from said support, an elongated plate-like member having an end in sliding engagement with the second named arm of said bracket and means for securing said plate-like member at the desired adjustment on said second arm, and an arcuate jaw member hinged at one end to said plate-like member and adapted to close down thereon for clamping between said plate-like member and said jaw a portion of a drape or the like, a bolt extending upwardly from said plate-like member and said jaw having a slotted free end adapted to engage said bolt, and a nut threaded on said bolt for engagement with the free end of said jaw for securing the latter in clamping position relative to said plate-like extension.

2. A drape bracket comprising a bracket member adapted to be secured to a support and having a longitudinally slotted arm to project outwardly from the support, an extension member for said arm in the form of a broad flat plate having a slotted end arranged in overlapping relation to said arm, bolt means engaging the slotted ends of said arm and arm extension for securing the latter at the desired adjustment, said arm extension adapted to have a portion of a drape draped thereover, and a clamping arm hinged at one end thereof to said arm extension at one end of the latter, and adapted to swing downwardly into cooperative position with said arm extension for loosely clamping a portion of the drape between said clamping arm and said arm extension, said clamping arm being longitudinally curved, and means for securing said clamping arm in cooperative clamping position relative to said arm extension.

LUTHER A. HARPER.